United States Patent [19]

Arthurs et al.

[11] Patent Number: 4,817,084
[45] Date of Patent: Mar. 28, 1989

[54] BATCHER-BANYAN PACKET SWITCH WITH OUTPUT CONFLICT RESOLUTION SCHEME

[75] Inventors: Edward Arthurs, Summit; Yu-Ngai J. Hui, North Plainfield, both of N.J.

[73] Assignee: Bell Communications Research, Inc., Livingston, N.J.

[21] Appl. No.: 919,793

[22] Filed: Oct. 16, 1986

[51] Int. Cl.[4] .............................................. H04Q 11/04
[52] U.S. Cl. .......................................... 370/60; 370/94
[58] Field of Search ........................ 370/60, 58, 64, 67, 370/94; 379/269, 285

[56] References Cited

U.S. PATENT DOCUMENTS

| | | | |
|---|---|---|---|
| 4,516,238 | 5/1985 | Huang et al. | 370/60 |
| 4,542,497 | 9/1985 | Huang et al. | 370/60 |
| 4,566,095 | 1/1986 | Devault et al. | 370/60 |
| 4,656,622 | 4/1987 | Lea | 370/60 |
| 4,665,514 | 5/1987 | Ching et al. | 370/60 |
| 4,685,128 | 8/1987 | Powell | 340/825.03 |
| 4,706,240 | 11/1987 | Payne, III | 370/60 |
| 4,720,854 | 1/1988 | Sand | 370/60 |
| 4,754,451 | 6/1988 | Eng et al. | 370/60 |

FOREIGN PATENT DOCUMENTS 8404015 10/1984 PCT Int'l Appl. .

OTHER PUBLICATIONS

J. D. Ullman, *Computational Aspects of VSLI*, Computer Science Press, 1985, pp. 239–241.
A. Huang et al., "Starlite: A Wide Band Digital Switch", Proceedings of the 1984 Globecom Conference.

*Primary Examiner*—M. H. Paschall
*Attorney, Agent, or Firm*—James W. Falk

[57] ABSTRACT

A mechanism is disclosed for resolving conflicts between input ports of a Batcher-Banyan network that wish to transmit data packets to the same output port during a particular packet switching cycle. In the present invention, each Batcher-Banyan packet switch cycle is divided into three phases. The first phase is an arbitration phase in which output port conflicts are resolved. In the second phase, the results of the arbitration are communicated to the winning input ports. The third phase is a data packet transmission phase in which data packets from the winning input ports are actually transmitted through the Batcher-Banyan network.

14 Claims, 3 Drawing Sheets

BATCHER-BANYAN PACKET SWITCH WITH OUTPUT CONFLICT RESOLUTION SCHEME

FIELD OF THE INVENTION

The present invention relates to an internally non-blocking packet switching network such as a Batcher-Banyan network, and more particularly to a mechanism for resolving conflicts between input ports of such a network that wish to transmit data packets to the same output port in the same packet switch cycle.

BACKGROUND OF THE INVENTION

An important element for providing broad band network services is a high capacity packet switching network capable of interconnecting a large number of subscriber lines.

Such a packet switching network should include i input ports (i=1,2,3, ... N) and j output ports (j=1,2,3 ... N). Typically, such a packet switching network is synchronous. During a packet switch cycle, packets present at the i input ports are routed through the packet switch to particular ones of the j output ports. More particularly, during a packet switch cycle each input port i may request delivery of a packet to a certain output port j.

A packet switching network is internally non-blocking if it can deliver all packets from the input ports i to the requested output ports j, when the output ports j are distinct for all input ports i making a request. However, an internally non-blocking switching network can still block if there are two simultaneous requests for the same output port. In this case, one or both packets directed to the same output port will be blocked or destroyed. Thus, a mechanism to resolve output port conflicts in internally non-blocking packet switching networks is required.

An example of an internally non-blocking packet switching network is the Batcher-Banyan network, which comprises a Batcher sorting network followed by a Banyan routing network. Batcher-Banyan networks are discussed in detail in J. D. Ullman "Computational aspects of VSLI" Computer Science Press, 1985, pages 239, 240, and A. Huang et al. "Starlite: A Wide Band Digital Switch" Proceedings of the 1984 Globecom Conference.

The Batcher-Banyan network is a self routing network which routes a packet from a particular input port to a particular output port based on a destination address in the packet header. It is known that an internally non-blocking data packet transmission results by first sorting the packets in non-decreasing order according to the destination address in a sorter network (e.g., a Batcher network) prior to routing the packets through a Banyan network. The Banyan network routes the packet to the particular output port address contained in the packet header. Unfortunately, blocking occurs in the resulting Batcher-Banyan network if more than one packet is addressed to a particular Banyan output port in any given packet switch cycle.

One particular scheme for resolving such output port conflicts is disclosed in the above-identified Huang et al. reference, which reference is directed to the Starlite switch. In the Starlite switch, the packets are routed through a Batcher sorting network and a Banyan routing network. The Batcher network serves to sort the packets in non-decreasing order according to destination address. At the output of the Batcher network, all but one packet addressed to each output port is purged, so that after purging only packets with unique destination addresses remain. Consequently, at the output of the Batcher network the packet destination addresses are in strictly increasing order, but with holes in the sequence due to purged packets. This sequence with holes can cause packet collisions in the subsequent Banyan network. Consequently, a concentration network is required in front of the Banyan network for skewing all packets toward the top to fill in the holes left by the purged packets. Such concentration networks involve rather complex operations such as counting the numbers of packets above a certain output line of the Batcher network. In general, concentration networks may be as complex as the Banyan network in terms of node counts.

In the Starlite switch, in order to deliver the purged packets, the purged packets are routed from the outputs of the Batcher sorting network to some input ports of the switch which are specially dedicated for re-entry of purged packets to reduce the number of input ports dedicated to re-entry, the purged packets go through a concentration network.

Thus, the above-described output port conflict resolution scheme suffers from the following shortcomings. First, half or more of the input ports are dedicated for re-entering packets. In addition, the remaining input ports must be loaded below about 40% to prevent excessive packet loss. The Starlite switch requires two concentration networks, with their associated chip sets and subsystem designs. Lastly, packets may be delivered out of sequence using the Starlite conflict resolution scheme.

Accordingly, it is the object of the present invention to provide a simpler more efficient scheme for resolving output port conflicts in an internally nonblocking packet switching network such as the Batcher-Banyan network.

SUMMARY OF THE INVENTION

The present invention is a method for resolving output port conflicts in an internally non-blocking packet switching network such as a Batcher-Banyan network. In other words, the present invention may be used to resolve conflicts between input ports that wish to transmit data packets to the same output port in the same switch cycle. In an illustrative embodiment of the invention, each Batcher-Banyan packet switch cycle is divided into three phases. The first phase is an arbitration phase in which output port conflicts are resolved. In the second phase, the results of the arbitration phase are communicated to the winning input ports. The third phase is a data packet transmission phase in which data packets from the winning input ports are actually transmitted through the Batcher-Banyan network.

In the arbitration phase, each input port wishing to transmit a data packet through the Batcher-Banyan network, first transmits an output port request packet through the Batcher sorting network. Each request packet comprises an input port address, indicating the input port of origin of the request packet, and an output port address, indicating the destination to which the input port wishes to transmit a data packet. The Batcher sorting network sorts the request packets in non-decreasing order according to the requested destinations, so that all but one request for a given destination may be easily purged. In the second or acknowledgement phase, the results of the arbitration are communicated to the winning input ports. Acknowledgement packets, comprising the input port address portion of each winning request packet, are routed from the outputs of the Batcher network back to the input ports of origin of the winning request packets. Illustratively, this acknowledgement packet routing is accomplished using the Batcher-Banyan network itself, without the use of additional networks such as concentration networks.

In the data packet transmission phase, the thus acknowledged input ports then send their data packets through the Batcher-Banyan network to the designated output ports without any conflict. Unacknowledged input ports buffer their packets at least until the next packet switch cycle.

The output port conflict resolution mechanism of the present invention is far simpler than the above-described prior art conflict resolution mechanisms. In particular, the use of complex hardware such as concentration networks may be eliminated.

DETAILED DESCRIPTION

Figure 1:
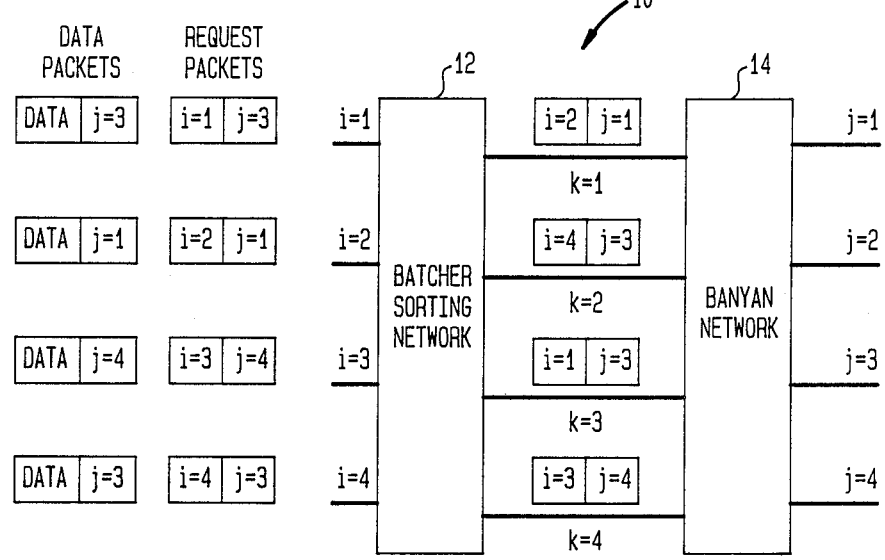
FIGS. 1 2, and 3 schematically illustrate a three phase method for resolving output port conflicts in a Batcher-Banyan network, in accordance with an illustrative embodiment of the invention.
Figure 2:
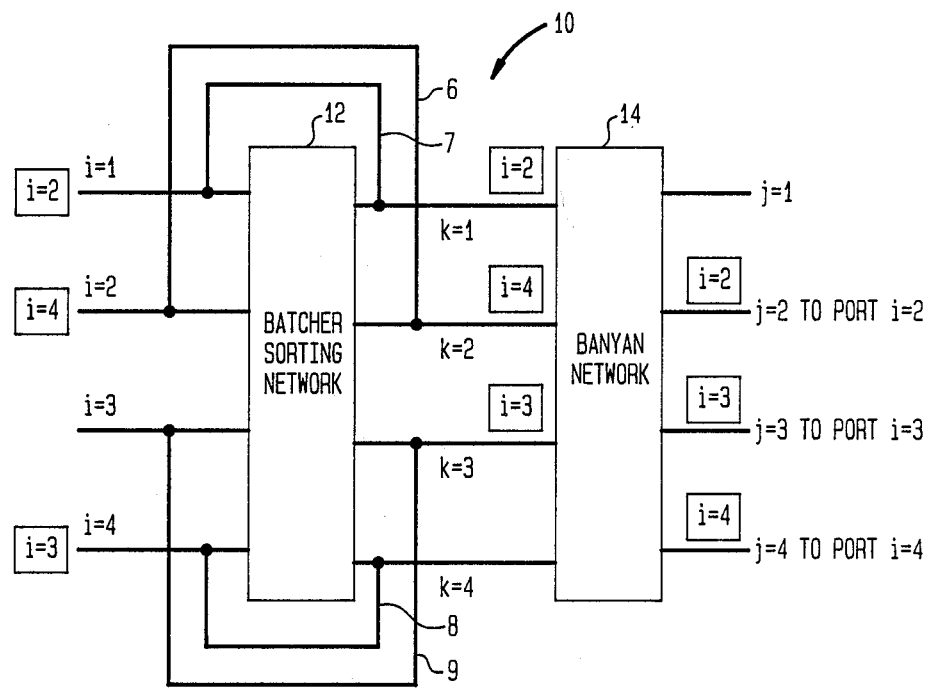
Figure 3:
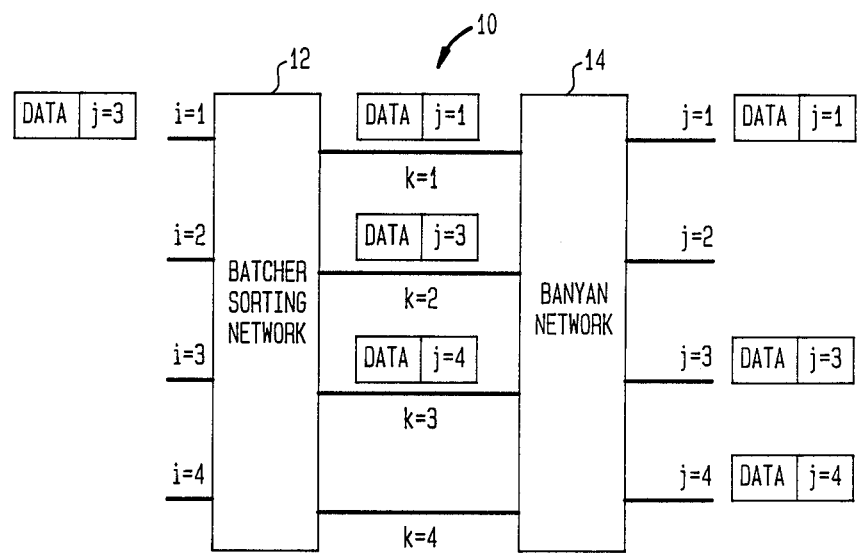

FIGS. 1, 2, and 3 schematically illustrate a three phase method for resolving output port conflicts in a Batcher- Banyan network 10. As shown in FIGS. 1, 2, and 3, the Batcher-Banyan network 10 comprises a Batcher sorting network 12 and a Banyan routing network 14. The network 10 has four input ports $i=1, 2, 3, 4$ and four output ports $j=1, 2, 3, 4$. The outputs of the Batcher network are designated $k=1, 2, 3, 4$. (The use of four input ports and four output ports is intended to be illustrative only.)

The Batcher network serves to arrange incoming packets in non-decreasing order according to an address contained in a header incorporated at the front of each packet. The Banyan network serves to route the packets at the outputs of the Batcher network to the particular output ports j designated in the packet headers.

The Batcher-Banyan network 10 is synchronous. In the present invention, in order to resolve output port conflicts, each Batcher-Banyan packet switch cycle is divided into three phases. The first phase (shown in FIG. 1) is an arbitration phase in which conflicts between input ports attempting to route data packets to the same output port are resolved. The second phase (shown in FIG. 2) is an acknowledgement phase in which winning input ports are informed of the results of the arbitration phase. The third phase (shown in FIG. 3) is a data transmission phase in which data packets are routed through the Batcher-Banyan network.

Turning to FIG. 1, each of the input ports $i=1, 2, 3, 4$ has a data packet that it wishes to route through the Batcher-Banyan network 10 to a particular output port j. The particular destination output port j is designated by the address in the data packet header at the front end of each data packet. Thus, the data packet at input port is to be routed to output port $j=3$. Similarly, the data packet at input ports 2, 3, and 4 are to be routed to output ports $j=1, 4, 3$ respectively. There is a conflict between the input port $i=1$ and the input port $i=4$, since both input ports wish to route their data packet to output port $j=3$. Such conflicts are resolved in accordance with the three phase method summarized above.

In the first phase, each input port routes a request packet through the Batcher sorting network 12. The request packet routed by each input port contains a pair of addresses. The first address is the output port j to which the input port wishes to send its data packet. The second address is the address i of the input port itself. Thus, each request packet comprises a destination address, source address pair j, i. Thus, for example, the request packet from input port $i=1$ comprises the pair $j=3, i=1$. Similarly, the request packet at input port $i=2$ comprises the pair $j=1, i=2$. As shown in FIG. 1, the request packets are sorted by the Batcher sorting network, so that at the output of the Batcher sorting network, the request packets are sorted in non-decreasing order according to destination address. Thus, the Batcher sorting network places conflicting requests adjacent to each other, so that purging of duplicate requests may be accomplished by comparing destination addresses at adjacent Batcher outputs. If the destination address at Batcher output k is equal to the destination address at Batcher output $k-1$, the request packet is purged to resolve an output port conflict. Thus, in FIG. 1, the request packet at Batcher output $k=3$ is purged since it has the same destination or output port address as the request packet at Batcher output $k=2$. In both cases the destination address is $j=3$. This means that the data packet at input port $i=1$ will not be transmitted during this particular Batcher-Banyan cycle. This completes the arbitration phase.

In the second or acknowledgement phase, the winning input ports are informed of the results of the arbitration. Such acknowledgement may be accomplished using the source address (i.e., input port address) portion of each of the winning request packets. Thus, the input port address portion of each winning request packet is routed back to its input port of origin to acknowledge the input port of origin as being a winner in the arbitration phase. As shown, in FIG. 1, at Batcher output $k=1$ input port address $i=2$ forms the acknowledgement packet. Similarly, at Batcher output $k=2$ input port address $i=4$ forms the acknowledgement packet, and at Batcher output $k=4$ input port address $i=3$ forms the acknowledgement packet. Batcher output $k=3$ has no acknowledgement packet since the request packet at this output was purged during the arbitration phase.

Each acknowledgement packet is then routed back to the input port address defined thereby. This means that the acknowledgement packet at Batcher output $k=1$ is ultimately routed to input port $i=2$. Similarly, the acknowledgement packets at Batcher outputs $k=2, 4$ are ultimately routed to input ports $i=4, 1$ respectively. This routing is accomplished using the Batcher-Banyan network as shown in FIG. 2.

The routing of the acknowledgement packets are shown in detail in FIG. 2. In the first step of the routing of the acknowledgement packets, the Batcher outputs $k=1, 2, 3, 4$ are connected to the Batcher inputs $i=1, 2, 3, 4$ such $k=1$ is connected to $i=1$, $k=2$ is connected to $i=2$, etc. Lines 6, 7, 8, 9 schematically illustrate these connections in FIG. 2. Thus, as shown in FIG. 2, the acknowledgement packets at the Batcher outputs k=1, k=2, k=4 are thus routed to the input ports i=1, i=2, i=4, respectively. These acknowledgement packets are then routed through the Batcher-Banyan network so that the acknowledgement packet containing input port address i=2 emerges at output port j=2. Similarly, the acknowledgement packets containing the input port addresses i=3, i=4 emerge at output ports j=3 and j=4 respectively. In other words, the acknowledgement packet containing input port address i emerges at output port j=i. The outputs j=1, 2, 3, 4 are then connected to the corresponding inputs i=1, 2, 3, 4 so that j=1 is connected to i=1 and j=2 is connected to i=2, etc. In this way, the acknowledgement packets containing the input port addresses i=2, 3, 4 are routed to the input ports defined by these addresses. This completes the second or acknowledgement phase of the Batcher-Banyan packet switch cycle. In the acknowledgement phase, the input port address portion of each winning request packet was routed back to its input port of origin to inform the input port that it was victorious in the arbitration phase and that it can transmit its data packet.

The third phase is the data transmission phase in which the winning input ports i=2, 3, 4 transmit their data packets. As shown in FIG. 3, data packets from these three input ports are routed through the Batcher-Banyan network without conflict. At the outputs of the Batcher network, these packets are sorted in increasing order according to destination output port addresses. The Banyan network then routes the packets in the sorted list to the appropriate output port without conflict. The data packet at input port i=1 is buffered until the next Batcher-Banyan switch cycle.

Figure 4:
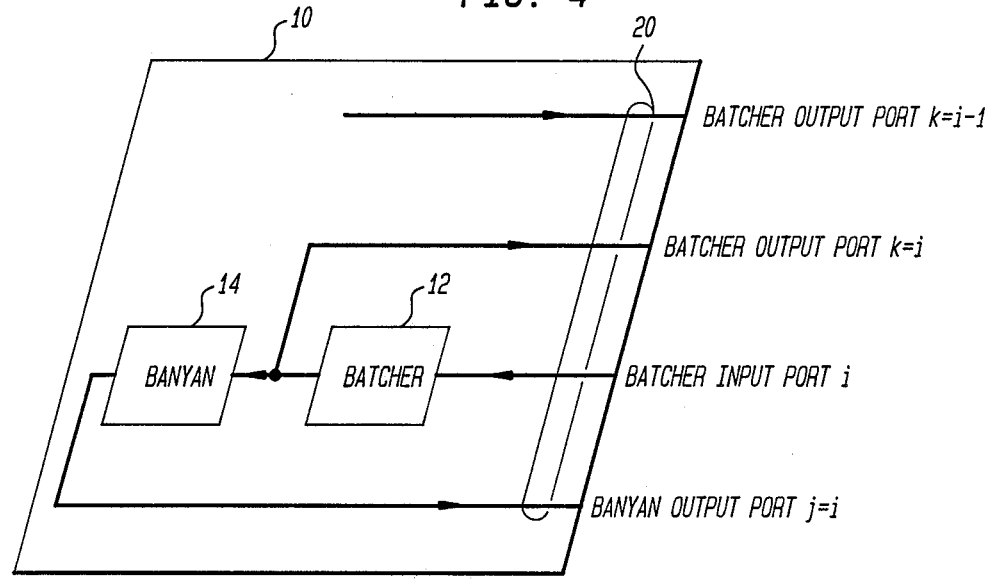
FIGS. 4 and 5 schematically illustrate circuitry for carrying out the method of FIGS. 1, 2, and 3, in accordance with an illustrative embodiment of the invention.
Figure 5:
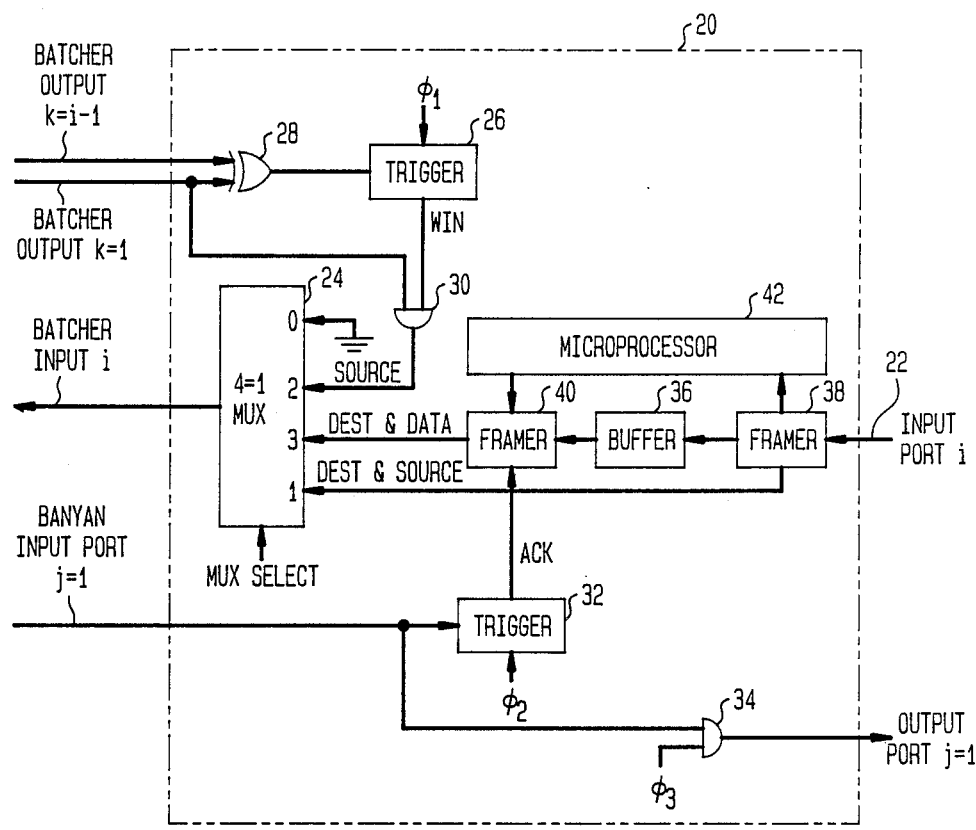

Hardware for implementing the above-described three phase algorithm is schematically illustrated in FIG. 4 and 5.

FIG. 4 schematically illustrates an input/output port interface 20 for the Batcher-Banyan network 10. As shown in FIG. 4, the ith port interface is connected to the Batcher network input i Batcher network output k=i, Batcher network output k=i−1 and Banyan network output j=i.

The input/output port interface circuitry is shown in more detail in FIG. 5. A data packet to be transmitted arrives at the port interface on line 22.

The three phase Batcher-Banyan packet switch cycle is controlled by the 4:1 Multiplexer 24. When MS=1 a request packet comprising a source, destination address pair enters the Batcher network over Batcher input i. MS is set to 1 for the duration of the request packet which equals 2 log$_2$ N for a switch network with N inputs. Afterwards MS=0, consequently blocking any signal into the Batcher network. The request packet makes its transit to the output of the Batcher network in the time ½ log$_2$ N (log$_2$ N+1). Just prior to the request packet exiting the Batcher network, the rising edge of the signal 100 $_1$ clears the trigger 26 for arbitration. The two request packets which emerge from the Batcher network at outputs k=i and k=i−1 are compared by Exclusive-OR-Gate 28 on a bit by bit basis. If the requested destinations are different, the Exclusive-OR-Gate transmits a rising edge to set the trigger 26 to the value WIN=1, signalling that the request at Batcher output k=i is granted. (If the two destinations are the same, WIN remains set at zero indicating the output port request associated with the request packet at output k=i of the Batcher network is not granted) The signal $\phi_1$ should last for the duration of the destination address portion of the request packet which equals log$_2$ N network with N inputs.

The second or acknowledgement phase is started by setting MS=2 in the Multiplexer 24. The acknowledgement packet is formed by the source address portion of the request packet at output k=i of the Batcher network. The acknowledgement packet is routed back into the Batcher network by means of gate 30 and Multiplexer 24. The acknowledgement packet is then routed through the Batcher-Banyan network. The total latency of the Batcher-Banyan network is ½ log$_2$N (log$_2$N+1)-+log N.

If port i is a winning port an acknowledgement packet will arrive after the Batcher-Banyan latency time. Just before the acknowledgement packet arrives, signal $\phi_2$ clears the trigger 32, and the arrival of an acknowledgement packet, would set the trigger signal ACK to 1. When ACK=1, the full data packet is transmitted into the Batcher-Banyan by setting MS=3 in the multiplexer 24 for the duration of the data packet length. A port interface losing the arbitration buffers its data packet in buffer 36 until the next switch cycle. The buffer 36 is located between framer circuits 38 and 40 which are operated under the control of microprocessor 42.

After the data packets travel through the Batcher-Banyan network, the signal $\phi_3$ enables a data packet arriving at Banyan output j=i to be transmitted to the outside world via gate 34.

The arbitration and acknowledgement phases constitute overhead processing for the Batcher-Banyan network. The overhead of the arbitration phase for an N input Batcher-Banyan network is ½ log$_2$N (log$_2$N+log$_2$N and the over head of Phase II is ½log$_2$N (log$_2$N+1)+2 log$_2$N for a total overhead time $$T = \log_2 N + 4)$$

When N=1024 and the length of data packet L=1024, the overhead fraction $$T/L = 14\%$$

The overhead fraction is less for packets of longer duration. For example if the data packet has 2048 bits then the overhead fraction is 7%.

Figure 6:
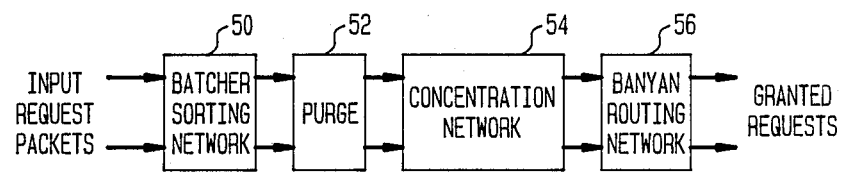
FIG. 6 schematically illustrates an alternative method and apparatus for resolving output port conflicts in a Batcher-Banyan network, in accordance with an alternative illustrative embodiment of the invention.

The three phase routing process has several alternative embodiments. One such embodiment may be carried out using the system of FIG. 6. This variation involves no wire connection between the outputs k of the Batcher network and the input ports i during the acknowledgement phase. In the embodiment of the invention illustrated in FIG. 6, request packets are routed through the Batcher sorting network 50 during the arbitration phase. Conflicting requests are purged by the purging circuitry 52 at the output of the Batcher network 50. The concentration network 54 eliminates all holes after purging and the request packets are routed to the outputs of the Banyan network 56. From this point on, the acknowledgement phase and the data packet transmission phase remain unchanged, except in the acknowledgement phase, the acknowledgement packets originate from the Banyan outputs rather than the Batcher outputs.

This modified three phase scheme can be reduced to a two phase scheme as follows. In phase I, each input port with a data packet sends the full packet through the network. Those packet winning the arbitration at the output of the Batcher sorting network 50 go all the way through the concentration network 54 and the Banyan routing network 56 to their destination ports. In Phase II, each output port receiving a data packet acknowledges the originating input port of the received packet by sending an acknowledgement packet to the originating input port in the manner discussed above. Viewed alternatively, this two phase scheme sends out a packet without the assurance of delivery, but retains a copy of the sent packet in a buffer and flushes the packet only if an acknowledgement is received.

Packet priority may be accounted for in the packet routing scheme of the present invention, through a modification of the arbitration phase. Packets with higher priority can be distinguished from packets of lower priority by a priority field appended at the end of the destination address of the request packet. The addresses with appended priority fields are sorted by the Batcher network, consequently placing the higher priority request packets at favorable positions, when packets with duplicate requests for a particular output port are purged.

This priority feature can be very profitable used for eliminating head of the queue blocking at Batcher-Banyan input ports. Under-utilization of the Batcher-Banyan network occurs when packets behind the first packet in a queue at an input port could have been delivered to a free output port, but were not because the first packet in the queue is blocked as a result of losing an output port conflict. A request to transmit the second packet in an input port queue may be granted by the following method. After the arbitration and acknowledgement phases, the packets at the head of the queue know whether or not they are blocked. The second packet in each blocked queue is then permitted to make a request in a second round of the arbitration and acknowledgement phases. These second round request attempts must not interfere with the requests granted during the first round. This non-interference can be accomplished by giving the request packets which won the first round a higher priority during the second round, so that they always win the second round. The same procedure can be repeated for a third round for the packets further back in the queues. However, this might result in a diminishing return which may not justify the overhead required for accommodating the extra phases.

Finally, the above-described embodiments of the invention are intended to be illustrative only. Numerous alternative embodiments may be devised by those skilled in the art, without departing from the spirit and scope of the claimed invention.

What is claimed is:

1. A method for routing data packets from the input ports to the output ports of a non-internally blocking packet switch network, said method comprising the steps of:
   for each input port having a data packet to transmit, routing an output port request packet into said network so as to purge all but one request for a given output port,
   acknowledging the input ports of origin as to the results of said purging step by utilizing said network to route acknowledgement packets to the input ports of origin of the non-purged request packets, and
   transmitting data packets from the acknowledged input ports through said network.

2. The method of claim 1 wherein each of said request packets comprises a source address identifying an input port and a destination address identifying an output port.

3. The method of claim 1 wherein said internally non-blocking network is a Batcher-Banyan network comprising a Batcher sorting network and Banyan routing network.

4. The method of claim 3 wherein said request packet routing step further includes routing request packets comprising a source address and a destination address into said Batcher sorting network to order said request packets according to the destination addresses contained therein.

5. The method of claim 4 wherein said acknowledging step further includes the step of routing the source address portion of each non-purged request packet from an output of said Batcher network back to its input port of origin.

6. The method of claim 5 wherein the source address portion of the request packet at the k th output of the Batcher network is routed to the k th input of the Batcher network and then through the Batcher-Banyan to the output port-having the same address as said source address portion.

7. The method of claim 3 wherein each request packet comprises a source address identifying an input port of origin and a destination address identifying an output port, and wherein said request packet routing step comprises routing said request packets through said Batcher network, through purging and concentration circuitry located at the output of said Batcher network, and through said Banyan network to the outputs thereof.

8. A method for resolving conflicts between input ports of a Batcher-Banyan network that wish to transmit data packets to the same output port during a particular packet switching cycle, said method comprising the steps of:
   (a) during an arbitration phase of said packet switching cycle, transmitting a request packet from each of said input ports into the Batcher portion of said Batcher-Banyan network to order said request packets according to destination address, and to purge all but one request directed to a given output destination,
   (b) during an acknowledgement phase of said packet switching cycle, routing acknowledgement packets from outputs of said Batcher network to the input ports of origin of the non-purged request packets by means of the Batcher-Banyan network, and
   (c) during a data packet transmission phase transmitting data packets through said Batcher-Banyan network from the acknowledged input ports.

9. A method for routing data packets from the input ports to the output ports of a packet switch network so as to resolve conflicts between input ports wishing to transmit data packets to the same output port in the same packet switch cycle, said method comprising the steps of
   (a) in an arbitration phase of each switch cycle, routing output port request packets from said input ports into said network to resolve output port conflicts by purging all but one request packet for a given output port,
   (b) in an acknowledgement phase of each switch cycle, routing an acknowledgement packet to the input port of origin of each non-purged request packet, and (c) in a data packet transmission phase of each switch cycle, transmitting data packets from said acknowledged input ports through said packet switch network.

10. The method of claim 9 wherein at least some of said data packets include a priority indicator and during said arbitration phase, packets with lower priority are distinguished from packets with high priority.

11. A method for routing data packets from the input ports to the output ports of a packet switch network so as to resolve conflicts between input ports wishing to transmit data packets to the same output port in the same switch cycle, said method comprising the steps of:

transmitting said data packets from said input ports into said network without assurance of delivery at said output ports while copies of said data packets are buffered at said input ports, purging all but one packet addressed to each output port, and transmitting acknowledgement packets from said output ports which receive data packets to said input ports to acknowledge those input ports whose packets have been delivered, and deleting said packets buffered at said acknowledged input ports.

12. A packet switch comprising an internally non-blocking packet switch network including a plurality of input ports and a plurality of output ports means for transmitting request packets into said network to arbitrate conflicts between input ports that wish to transmit data packets to the same output port in the same packet switching cycle, and means for transmitting acknowledgement packets to input ports winning said arbitration.

13. The switch of claim 12 wherein said network is a Batcher-Banyan network comprising a Batcher sorting network and a Banyan routing network.

14. A method for routing data packets from the input ports to the output ports of a packet switching network during a single switching cycle of the packet switching network, said method comprising the steps of, detecting and resolving conflicts between input ports having data packets destined for the same output port while said data packets are being buffered at said input ports and before any of said data packets are transmitted from said input ports into said packet switching network, based on the results of said detecting and resolving step, transmitting a subset of said data packets from said input ports through said packet switching network to said output ports so that no more than one packet is transmitted to each output port, and buffering the remainder of said packets at said input ports for subsequent transmission through the packet switching network.

* * * * *